United States Patent
Al-Johar et al.

(10) Patent No.: US 12,215,808 B2
(45) Date of Patent: Feb. 4, 2025

(54) PORTABLE PIPE SUPPORTS COMPRISING NONMETALLIC RODS

(71) Applicant: SAUDI ARABIAN OIL COMPANY, Dhahran (SA)

(72) Inventors: Abdullatif H. Al-Johar, Mubarraz (SA); Mamdouh S. Al-Therman, Mubarraz (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/329,439

(22) Filed: Jun. 5, 2023

(65) Prior Publication Data

US 2024/0401719 A1 Dec. 5, 2024

(51) Int. Cl.
F16L 3/00 (2006.01)

(52) U.S. Cl.
CPC .................................. F16L 3/00 (2013.01)

(58) Field of Classification Search
CPC . F16L 3/00; F16L 3/04; F24F 13/0254; E04D 13/12; E04D 11/007
USPC ...... 248/49, 65, 70, 346.01; 52/126.1, 126.2
See application file for complete search history.

(56) References Cited

U.S. PATENT DOCUMENTS

| | | | |
|---|---|---|---|
| 5,588,511 A | 12/1996 | Kallenbach | |
| 6,076,778 A * | 6/2000 | Brown | F16L 3/227 248/70 |
| 6,375,129 B2 * | 4/2002 | Koziol | H02G 3/26 248/65 |
| 7,008,686 B1 * | 3/2006 | Rogers | F16F 7/00 428/116 |
| D521,851 S * | 5/2006 | Smart | D8/354 |
| D649,434 S * | 11/2011 | Lalancette | D8/354 |
| 9,732,884 B1 * | 8/2017 | Keller | E21B 19/15 |
| 2011/0204529 A1 * | 8/2011 | Kerkhoff | F16L 3/00 264/34 |
| 2014/0332641 A1 * | 11/2014 | Wilson | F16L 3/04 248/71 |

FOREIGN PATENT DOCUMENTS

RU 177801 U1 3/2018

* cited by examiner

*Primary Examiner* — Muhammad Ijaz

(74) *Attorney, Agent, or Firm* — Vorys, Sater, Seymour and Pease LLP

(57) ABSTRACT

A portable pipe support includes a body providing opposing bottom and top portions, a nonmetallic support rod arranged within a recess defined in the top portion such that a portion of the nonmetallic rod protrudes above an upper surface of the top portion, and one or more anchors embedded within the body at the top portion. Each anchor includes opposing first and second legs extending substantially parallel to each other and straddling the nonmetallic support rod, a foot extending laterally from an end of each of the first and second legs and embedded within the body, and an upper loop cooperatively formed by each leg curving toward each other above the top portion.

18 Claims, 3 Drawing Sheets

PORTABLE PIPE SUPPORTS COMPRISING NONMETALLIC RODS

FIELD OF THE DISCLOSURE

The present disclosure relates generally to the oil and gas industry and, more particularly, to portable pipe supports comprising nonmetallic rods and methods of using the same.

BACKGROUND OF THE DISCLOSURE

In the oil and gas industry, pipelines are used to transport hydrocarbons (e.g., oil and gas) and other flowable substances long distances. In some case, the hydrocarbons are transported to a market area for immediate consumption (e.g., vehicle fuel, use in forming downstream products, or the like).

Portable pipe supports (PPS) are commonly used to support the weight of aboveground pipelines and any contents flowing therein over lengthy spans. Engineering of PPSs is critical to the proper operations of a pipeline, including at offset locations of the pipeline, where the pipeline changes direction, elevation, or both. Pipelines are designed and expected to expand due to thermal expansion, and as a result of the presence of offsets. PPSs help prevent pipe stresses in excess of what is allowable, aid in the prevention of leaking (e.g., due to offset of piping joints), absorb excess vibrations, counter undesirable environmental conditions and dynamic loadings (e.g., thermal, seismic, water hammer, slug, wind, and the like), and prevent unintentional decoupling of the pipeline at flanged couplings.

Some PPSs are designed for supporting unrestrained pipelines, and such PPSs are often composed of concrete and include a metallic support rod or pipe secured to the concrete body at its top where the pipeline rests and is supported. Conventional PPSs can pose a hazard due to friction created between the opposing metallic pipeline and support rod, which can lead to leaks of the hydrocarbons and potentially resulting in a fire incident.

What is needed is an alternative PPS that reduces or prevents friction between the pipeline and the underlying PPS, while simultaneously providing the desired support to the pipeline without posing a fire incident risk.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a portable pipe support is disclosed and includes a body providing opposing bottom and top portions, a nonmetallic support rod arranged within a recess defined in the top portion such that a portion of the nonmetallic rod protrudes above an upper surface of the top portion, and one or more anchors embedded within the body at the top portion. Each anchor can include opposing first and second legs extending substantially parallel to each other and straddling the nonmetallic support rod, a foot extending laterally from an end of each of the first and second legs and embedded within the body, and an upper loop cooperatively formed by each leg curving toward each other above the top portion.

According to another embodiment consistent with the present disclosure, a pipeline system is disclosed and includes a pipeline that includes a plurality of interconnected pipe lengths, one or more portable pipe supports (PPS) arranged to support the pipeline. Each PPS may include a body providing opposing bottom and top portions, a nonmetallic support rod arranged within a recess defined in the top portion such that a portion of the nonmetallic rod protrudes above an upper surface of the top portion, and one or more anchors embedded within the body at the top portion. Each anchor may include opposing first and second legs extending substantially parallel to each other and straddling the nonmetallic support rod, a foot extending laterally from an end of each of the first and second legs and embedded within the body, and an upper loop cooperatively formed by each leg curving toward each other above the top portion.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

The present disclosure relates generally to the oil and gas industry and, more particularly, to portable pipe supports comprising nonmetallic rods and methods of using the same.

Embodiments of the present disclosure will now be described in detail with reference to the accompanying Figures. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Current portable pipe supports (PPS) include a short length of standard schedule pipe that serves as a support rod that contacts and supports the underside of a pipeline. Such standard schedule pipes are metallic (e.g., carbon steel) and, as such, pose a fire risk due to friction and leakage of hydrocarbon liquids, gas, or disposal water. Common compounds and/or chemicals that may flow through pipelines include, but are not limited to, gasoline, propane, methane, ethanol, hydrogen, butane, diesel fuel, and others. Each of these fluids are highly flammable and can ignite easily. Further, conventional PPSs with metallic support rods can also result in corrosion (e.g., oxidization, rust, etc.) between the supported pipeline and the underlying metallic support rod, which can diminish the lifespan of the pipeline.

According to embodiments of the present disclosure, the metallic, standard schedule pipe of conventional PPSs can be replaced with a nonmetallic support rod, which reduces or avoids friction between aboveground pipelines and the PPS, thereby substantially averting potential fire incidents. Nonmetallic support rods can also help eliminate corrosion due to prolonged contact with the pipeline. The PPSs described herein may be capable of providing support for unrestrained pipelines exhibiting a diameter of 16 inches or smaller, but it is also contemplated herein that the PPSs can support pipelines of larger diameters, without departing from the scope of the disclosure. As used herein, the term "unrestrained pipeline," and any grammatical variants thereof, refers to piping that is free to displace, flex, or expand axially, horizontally, or laterally, such as at offset locations where the pipeline changes direction, elevation, or both.

Figure 1:
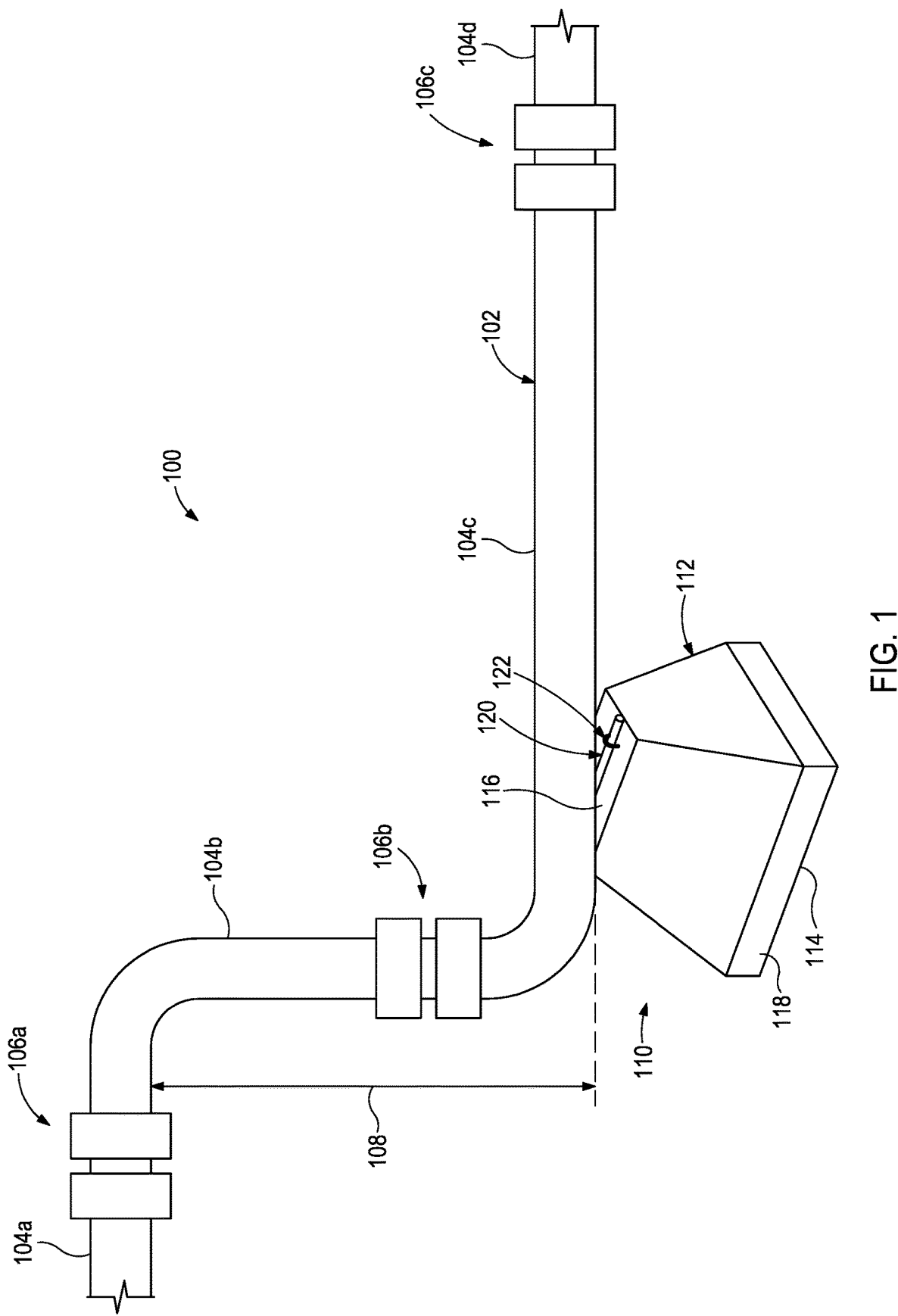
FIG. 1 is an isometric view of an example pipeline system that may incorporate the principles of the present disclosure.

Referring first to FIG. 1, illustrated is an isometric view of an example pipeline system 100 that may incorporate the principles of the present disclosure. As illustrated, the pipeline system 100 includes a pipeline 102 that includes a plurality of interconnected pipe segments or "lengths", shown as a first pipe length 104a (partially shown), a second pipe length 104b, a third pipe length 104c, and a fourth pipe length 104d (partially shown). The first and second pipe lengths 104a,b may be interconnected at a first joint 106a, the second and third pipe lengths 104b,c may be interconnected at a second joint 106b, and the third and fourth pipe lengths 104c,d may be interconnected at a third joint 106c. As illustrated, the joints 106a-c may comprise flanged coupling joints, but could alternatively comprise other types of joints suitable for connecting contiguous pipe lengths 104a-d.

The pipeline 102 may exhibit a diameter of 16 inches or less, such as in the range of 0.5 inches normal pipe size (NPS) to 16NPS, and encompassing any value and subset therebetween. In other embodiments, however, the pipeline 102 may exhibit a diameter greater than 16 inches, without departing from the scope of the disclosure.

The composition of the pipeline 102, and more particularly the pipe lengths 104a-d, may comprise a metallic material such as, but not limited to, carbon steel, stainless steel, structural steel, fabricated steel, ductile iron, alloys thereof, or any combination thereof. In other embodiments, however, all or a portion of the pipeline 102 may be made of other rigid materials, such as, but not limited to a rigid plastic (e.g., polyvinyl chloride, high density polyethylene, fiber reinforced polymer, etc.), a composite material, or any combination of the foregoing materials. The pipeline 102 may be coated or uncoated, internally or externally. For example, when the pipeline 102 is composed of a material subject to corrosion (e.g., rust, oxidation, etc.), such as ferrous materials, an external coating may be used to protect the pipeline 102 from the damaging effects of corrosion related to environmental conditions. Similarly, internal coating may be used to protect the pipeline 102 from the damaging effects of corrosion and abrasion related to components (fluids) present with the flowing composition in the pipeline 102.

While not shown, the pipeline 102 may further comprise various elements, such as, but not limited to, elbows, tees, reducers, unions, crosses, caps, swage nipples, plugs, bushings, adapters, outlets, valves, flanges, and any combination thereof. In one or more instances, the pipeline 102 may be further be associated with one or more components, such as, but not limited to, a pump station, a control room, a meter regulator station, a breakout tank, a storage facility, or any combination thereof.

The pipeline 102 may be generally or entirely "unrestrained," meaning that the pipeline 102 is allowed to displace, flex, or expand axially, horizontally, or laterally. As illustrated, the pipeline 102 may provide one or more offsets 108, shown in FIG. 1 as a vertical or elevation transition. More particularly, the second pipe length 104b provides a bent transition or corner that changes the elevation (height) of the pipeline 102. In other embodiments, the offset 108 may comprise a lateral transition where the first and second pipe lengths 104a,b extend in the same plane. In at least one embodiment, the first and third pipe lengths 104a,c may extend substantially horizontal and in the same plane.

As illustrated, the pipeline system 100 may further include one or more portable pipe supports (PPS) 110 (one shown). The PPS 110 may be configured to support various portions of the pipeline 102, especially in areas of where the pipeline 102 experiences an offset, such as the offset 108. In the illustrated embodiment, the PPS 110 directly supports the third pipe length 104c, but could alternatively support any other portion of the pipeline 102, without departing from the scope of the disclosure. The PPS 110 may provide particular advantageous support to the pipeline 102 at the offset 108 because such locations have traditionally been prone to leakage and therefore fire incident. In some instances, two or more PPSs 110 may be arranged in series (i.e., in a line) and in the direction of an offset to suit particular elevation changes.

As illustrated, the PPS 110 may include a body 112 that provides a bottom portion 114 and an opposing top portion 116. In some embodiments, the opposing bottom and top portions 116 may comprise planar surfaces that are generally parallel to each other. The bottom portion 114 may provide or otherwise define a base 118 configured to rest on an underlying substrate (e.g., the ground, a concrete slab, sand, rock, etc.). In some embodiments, as illustrated, the body 112 may assume the general shape of a truncated pyramid, where the bottom and top portions 114, 116 are substantially parallel to each other and four opposing sides extend between the bottom and top portions 114, 116. In at least one embodiment, the base 118 may exhibit a generally rectangular shape, but could alternatively exhibit other shapes including, but not limited to, other polygonal shapes (e.g., triangular, pentagonal, hexagonal, etc.), circular, oval, ovoid, or any combination thereof.

The body 112 may be composed of any material, provided that it is capable of supporting the weight of the pipeline 102 and the contents flowing therein. In at least one embodiment, the composition of the body 112 is designed to withstand a pressure of 21 MPa. Example materials for the body 112 include, but are not limited to, cement (e.g., Portland cement, lime cement), a fiber-reinforced polymer, a metal, or any combination thereof. In at least one embodiment, the body 112 is composed of a cement. In such embodiments, the cement may further include one or more additives to strengthen or otherwise alter the mechanical properties of the cement, and thereby achieve desired operative qualities for supporting the pipeline 102. Such additives may include, but are not limited to, fly ash, blast-furnace slag, silica fume, limestone fume, rebar, or any combination thereof.

A nonmetallic support rod 120 may be provided at or on the top portion 116, and may be held in place by one or more anchors 122 (one visible) coupled to (e.g., embedded within) the body 112 of the PPS 110. As described in more detail below, the nonmetallic support rod 120 may be situated on the top portion 116 such that it extends (protrudes) a short distance above the upper surface of the top portion 116 of the PPS 110 to enable direct contact with the pipeline 102.

The anchors 122 are designed to maintain the nonmetallic support rod 120 in place at the top portion 116 of the PPS 110. As described in more detail below, the anchors 122 are embedded within and otherwise extend through the top portion 116 and into the interior of the body 112 of the PPS 110. The anchors 122 are generally looped or arcuate in shape, and extend about (loop around) the nonmetallic support rod 120 at opposing ends thereof to hold it in place. In other embodiments, however, the anchors 122 need not be looped or arcuate in shape, and may instead exhibit any shape capable of restricting movement and/or removal of the nonmetallic support rod 120.

Further, as also described below, the anchors 122 may be secured to the body 112 such that they extend beyond (protrude away from) the top portion 116 of the PPS 110 and beyond the nonmetallic support rod 120. In particular, the anchors 122 may assist in preventing unintentional lateral disengagement of the pipeline 102 from the PPS 110 by essentially serving as a saddle for the pipeline 102.

The anchors 122 may be made of materials capable of maintaining (securing) the nonmetallic support rod 120 and preventing unintentional disengagement of the pipeline 102 from the PPS 110. Such materials include metals, rigid plastics, composite materials, any combination thereof, or the like. In at least one embodiment, the anchors 122 may comprise and otherwise may be made of steel rebar, such as 20 millimeter (mm) diameter rebar. In other embodiments, however, the diameter of the material may be greater than or less than 20 mm, and encompassing any value and subset therebetween.

The nonmetallic material forming the nonmetallic support rod 120 may include any nonmetallic, rigid or semi-rigid material including, but not limited to, a plastic, a composite material (e.g., carbon fiber, fiberglass, etc.), an elastomer, graphene, concrete, or any combination thereof. Suitable plastic materials used for the nonmetallic support rod 120 may include, but are not limited to, a thermoplastic material, a thermoset material, polyurethane, nylon, polypropylene, high-density polyethylene, polyethylene, polyethylene terephthalate, polycarbonate, polyvinylchloride, methacrylate, or any combination thereof. In one or more embodiments, these plastics may be glass fiber filled for further reinforcement. In at least one embodiment, the nonmetallic support rod 120 may be made of the thermoplastic material I-ROD®, available from Deepwater Corrosion Services of Houston, Texas, USA. Using a non-metallic material for the support rod 120 may provide advantageous in helping to prevent friction between a metal-to-metal engagement, but may also help mitigate corrosion and rusting, thereby ensuring the longevity and safety of the support structure.

Figure 2A:
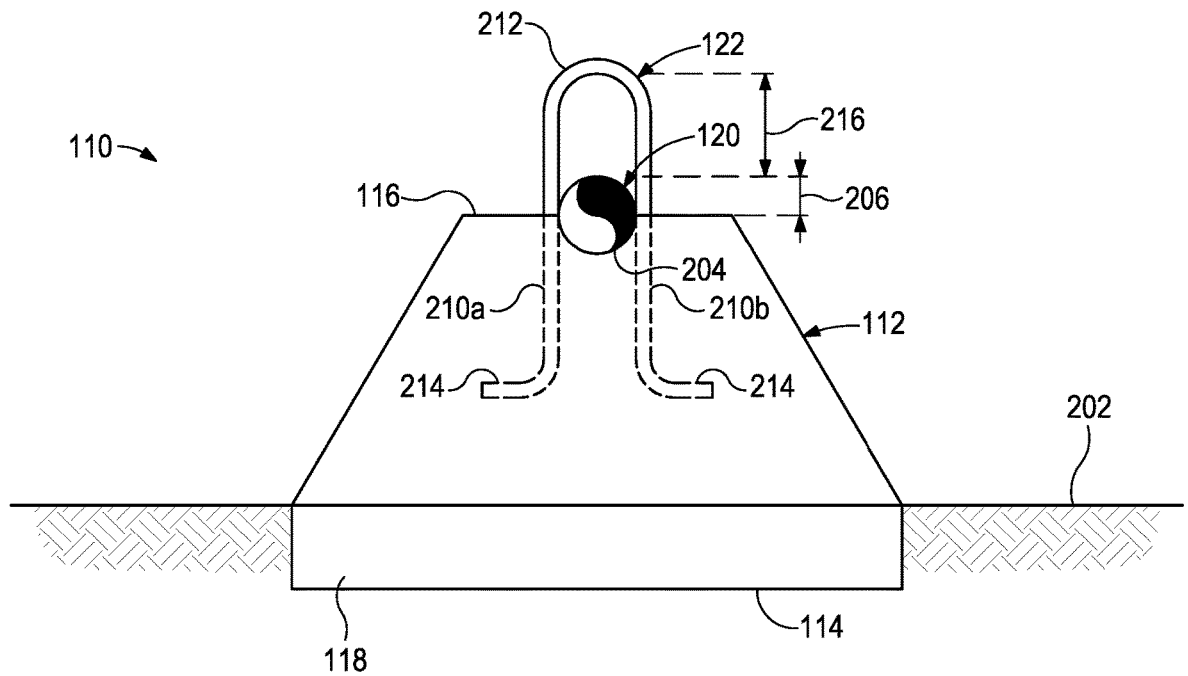
FIG. 2A is a schematic end view of the portable pipe support of FIG. 1.
Figure 2B:
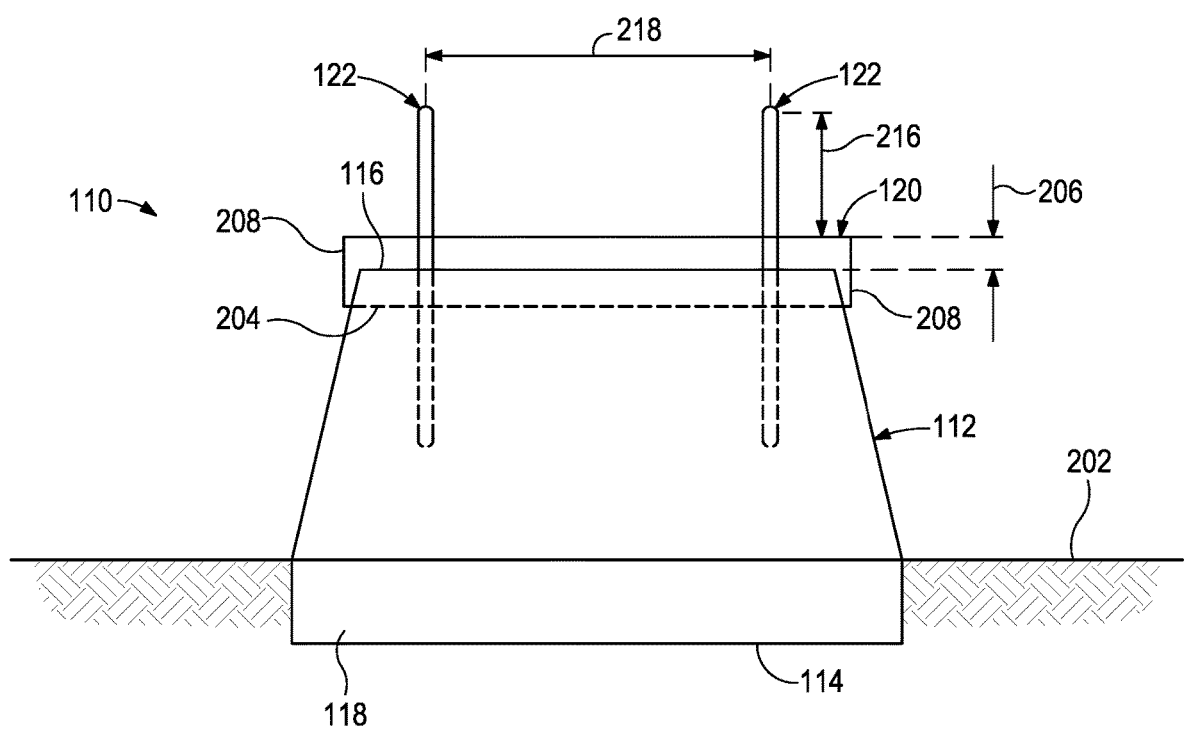
FIG. 2B is a schematic side view of the portable pipe support of FIG. 1.
Figure 2C:
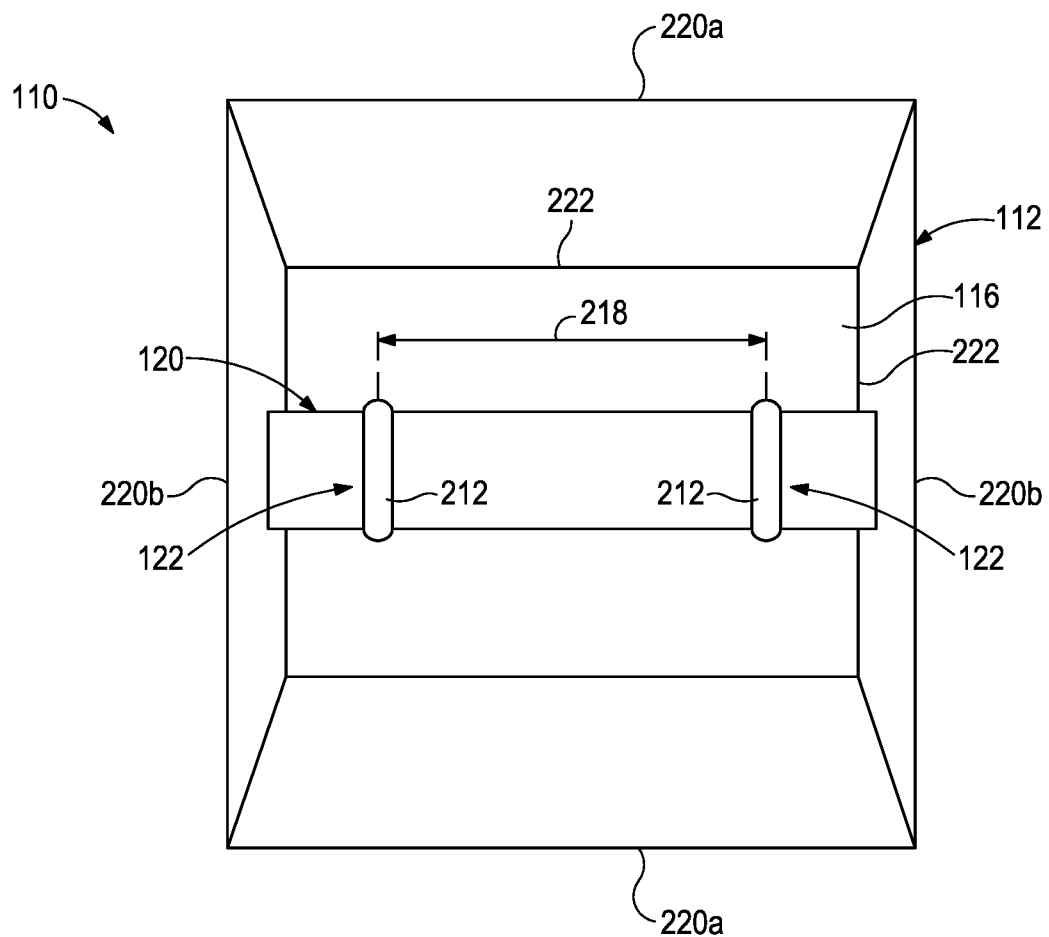
FIG. 2C is a schematic plan (top) view of the portable pipe support of FIG. 1.

FIGS. 2A-2C are schematic views of the PPS 110 of FIG. 1, according to embodiments the present disclosure. More specifically, FIG. 2A is a schematic side end view of the PPS 110, FIG. 2B is a schematic side view of the PPS 110, and FIG. 2C is a schematic plan (top) view of the PPS 110.

As illustrated, the PPS 110 includes the body 112, which provides the opposing bottom and top portions 114, 116, and the bottom portion 114 provide or defines the base 118 (FIGS. 2A-2B) configured to rest on or within an underlying substrate 202. In the illustrated embodiment, the base 118 is embedded partially within the underlying substrate 202. In such embodiments, the underlying substrate 202 may comprise, for example, sand. In other embodiments, however, the base 118 may be configured to rest on the top of the underlying substrate 202. In such embodiments, the underlying substrate 202 may comprise, for example, concrete, a concrete slab, rock, or other substantially rigid materials or terrain.

The nonmetallic support rod 120 is provided at or on the top portion 116. In some embodiments, as best seen in FIGS. 2A-2B, the nonmetallic support rod 120 may be positioned within a channel, groove, or recess 204 provided or otherwise defined in the top portion 116. As illustrated, the recess 204 may extend a short distance into the material of the body 112, and thus provide a location to receive and seat the nonmetallic support rod 120.

In one or more embodiments, the nonmetallic support rod 120 may be immovably secured within the recess 204. In such embodiments, the nonmetallic support rod 120 may be positioned in the recess 204 during the manufacturing or casting process for the body 112 and thereby permanently secured therein. In other embodiments, however, the nonmetallic support rod 120 may be immovably secured to the body 112 within the recess 204 using an adhesive or the like. In yet other embodiments, the nonmetallic support rod 120 may be received within the recess 204 but not secured thereto and otherwise able to freely translate (laterally) within the recess 204, without departing from the scope of the disclosure. In such embodiments, the nonmetallic support rod 120 may be removed and replaced if the nonmetallic support rod 120 becomes damaged, for example.

The nonmetallic support rod 120 may be received within the recess 204 and otherwise situated on the top portion 116 such that a portion of the nonmetallic support rod 120 extends (protrudes) a distance 206 (FIGS. 2A-2B) above the upper surface of the top portion 116. As will be appreciated, this enables the nonmetallic support rod 120 to directly contact and engage the pipeline 102 (FIG. 1) during example operation. The distance 206 may comprise any magnitude for sufficient engagement between the pipeline 102 (FIG. 1) and the nonmetallic support rod 120 such that the pipeline 102 does not contact the upper surface of the top portion 116. Example magnitudes for the distance 206 include, but are not limited to, a half-inch, 1 inch, 2 inches, 6 inches, and encompassing any value and subset therebetween.

In some embodiments, as best seen in FIG. 2A, the nonmetallic support rod 120 may comprise a cylindrical structure having a generally circular cross-sectional shape. In other embodiments, however, the nonmetallic support rod 120 may exhibit other cross-sectional shapes including, but not limited to, polygonal (e.g., square, rectangular, triangular, pentagonal, hexagonal, etc.), oval, ovoid, or an accommodation thereof. In some embodiments, the nonmetallic support rod 120 may comprise a solid piece of material, such as a solid rod or solid shaft of material. In other embodiments, however, the nonmetallic support rod 120 may be hollow, similar to a pipe or conduit, without departing from the scope of the disclosure. A solid rod may be advantageous in providing a stronger and more durable support system capable of withstanding the weight and pressure of the pipeline.

The nonmetallic support rod 120 exhibits a length sufficient to span all or a portion of the top portion 116 of the PPS 110. In some embodiments, as best seen in FIGS. 2B-2C, the length of the nonmetallic support rod 120 may be large enough such that one or both of the opposing distal ends 208 of the nonmetallic support rod 120 extend past the lateral extents of the top portion 116.

The PPS 110 further includes the one or more anchors 122 (two shown) coupled to the body 112 of the PPS 110. In some embodiments, the anchors 122 may be embedded within the body 112. In such embodiments, the anchors 122 may be cast into the body 112 during the manufacturing or forming process of the body 112. In other embodiments, however, the anchors 122 may be attached to the body 112 post manufacturing, without departing from the scope of the disclosure.

As best seen in FIG. 2A, each anchor 122 may include opposing first and second legs 210a and 210b that extend substantially parallel to each other. In some embodiments, the legs 210a,b may be configured to straddle and otherwise extend on opposing sides of the recess 204 and, therefore, on opposing sides of the nonmetallic support rod 120. In such embodiments, the legs 210a,b may help retain the nonmetallic support rod 120 within the recess 204.

At the top of each anchor 122, the legs 210a,b curve towards each other and cooperatively form an upper loop 212. In some embodiments, in contrast, the bottom of each anchor 122 each leg 210a,b may extend laterally outward and away from each other, thereby forming corresponding feet 214. Each foot 214 may extend laterally for a distance 212 ranging between about 1 inch and about 5 inches. As will be appreciated, the feet 214 may prove advantageous in helping secure the anchors 122 in the material of the body 112, thereby helping prevent inadvertent pullout of the anchors 122.

As best seen in FIGS. 2A-2B, the anchors 122 may extend from the upper surface of the top portion 116 such that a gap 216 may be defined between the top of the nonmetallic support rod 120 and an underside of the upper loop 212. In embodiments where the nonmetallic support rod 120 is not securely fastened to the body 112 within the recess 204, the gap 216 may provide space to dislodge and remove the nonmetallic support rod 120 from the recess 204, such as when it may be necessary to replace the nonmetallic support rod 120 on account of damage. In other embodiments, however, the gap 216 may provide a location to grasp onto the PPS 110, thereby making it "portable".

As best seen in FIGS. 2B-2C, the anchors 122 may be laterally offset from each other a short distance such that a space 218 may be defined therebetween. The magnitude of the space 218 may vary, depending on the application. In some embodiments, the space 218 may be sized and otherwise configured to receive the pipeline 102 (FIG. 1). In such embodiments, the space 218 may operate as a type of saddle designed to receive and seat the pipeline 102 therein. During example operation, the opposing anchors 122 positioned at each end of the space 218 may help prevent unintentional lateral disengagement of the pipeline 102 from off the top of the PPS 110.

The embodiments of the present disclosure therefore provide a PPS with a nonmetallic support rod capable of reducing friction between a supported pipeline, and thereby preventing potential leaks that may pose a fire risk incident. The PPS has a base having opposing top and bottom portions, and one or more anchors may be embedded in the body of the PPS to help secure the nonmetallic support rod to the body. The nonmetallic support rod extends above the top portion, and the anchors may extend above the top portion at a distance greater than the nonmetallic support rod.

The embodiments described herein further contemplate methods of reducing fire risk incidence from a pipeline comprising flowing hydrocarbon liquid, gas, or disposal water from an oil a gas operation. The method may include supporting the pipeline with a PPS and associated nonmetallic support rod of the present disclosure. Moreover, the PPS is portable and thus can be moved as terrain changes and to support offsets in the pipeline, among other sections thereof.

Example Dimensions

In one or more aspects, the height from the base 118 to the top portion 116 of the PPS 110 is in the range of about 300 mm to about 400 mm, encompassing any value and subset therebetween. In some instances, the height from the base 118 to the top portion 116 of the PPS 110 is about 355 mm.

In some instances, the distance between the feet 214 and the upper loop 212 of the anchor 122 is in the range of about 330 mm to about 430 mm, encompassing any value and subset therebetween. In some instances, the distance between the feet 214 and the upper loop 212 of the anchor 122 is 380 mm.

In some aspects, the distance between the feet 214 of the anchor 122 to the top portion 116 is in the range of about 180 mm to about 320 mm, encompassing any value and subset therebetween. In some instances, the distance between the feet 214 and the top portion 116 of the PPS 110 is 230 mm.

In some aspects, the distance between the top portion 116 of the PPS 110 to the upper loop 212 of the anchor 122 is in the range of about 100 mm to about 200 mm, encompassing any value and subset therebetween. In some instances, the distance between the top portion 116 and the upper loop 212 is 150 mm.

In some instances, as best seen in FIG. 2C, the length of the edges 220a and 220b of the bottom portion 114 may be in the range of about 910 mm to about 1170 mm, encompassing any value and subset therebetween. In one embodiment, first opposing edges 220a of the bottom portion 114 have a length of 910 mm and second opposing edges 220b of the bottom portion 114 have a length of 1170 mm.

Still referring to FIG. 2C, in one or more aspects, the length of the edges 222 of the top portion 116 may be in the range of about 750 mm to about 950 mm, encompassing any value and subset therebetween. In some instances, the length of the edges 222 of the top portion 116 is 860 mm.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The invention claimed is:

1. A portable pipe support, comprising:
a body providing opposing bottom and top portions;
a nonmetallic support rod arranged within a recess defined in the top portion such that a portion of the nonmetallic rod protrudes above an upper surface of the top portion, the nonmetallic support rod exhibiting a length such that opposing distal ends of the nonmetallic support rod extend past lateral extents of the top portion; and
one or more anchors embedded within the body at the top portion, each anchor including:
opposing first and second legs extending substantially parallel to each other and straddling the nonmetallic support rod;
a foot extending laterally from an end of each of the first and second legs and embedded within the body; and
an upper loop cooperatively formed by each leg curving toward each other above the top portion.

2. The portable pipe support of claim 1, wherein the body is in the shape of a truncated pyramid and the bottom and top portions are substantially parallel to each other.

3. The portable pipe support of claim 1, wherein the nonmetallic material is selected from the group consisting of a thermoplastic material, a thermoset material, a composite material, an elastomer, graphene, concrete, and any combination thereof.

4. The portable pipe support of claim 1, wherein the nonmetallic material is selected from the group consisting of polyurethane, nylon, polypropylene, high-density polyethylene, polyethylene, polyethylene terephthalate, polycarbonate, polyvinylchloride, methacrylate, and any combination thereof.

5. The portable pipe support of claim 1, wherein the nonmetallic support rod is immovably secured within the recess.

6. The portable pipe support of claim 1, wherein the nonmetallic support rod is freely received within the recess and able to move within the recess.

7. The portable pipe support of claim 1, wherein each anchor extends from an upper surface of the top portion such that a gap is defined between the nonmetallic support rod and an underside of the upper loop.

8. The portable pipe support of claim 1, wherein the one or more anchors comprise first and second anchors separated from each other such that a space is defined therebetween, and wherein a magnitude of the space is sized to receive a pipeline supported on the nonmetallic support rod.

9. A pipeline system, comprising:
a pipeline that includes a plurality of interconnected pipe lengths;
one or more portable pipe supports (PPS) arranged to support the pipeline, each PPS comprising:
a body providing opposing bottom and top portions;
a nonmetallic support rod arranged within a recess defined in the top portion such that a portion of the nonmetallic rod protrudes above an upper surface of the top portion, wherein the pipeline is unrestrained and rests on the nonmetallic support rod; and
one or more anchors embedded within the body at the top portion, each anchor including:
opposing first and second legs extending substantially parallel to each other and straddling the nonmetallic support rod;
a foot extending laterally from an end of each of the first and second legs and embedded within the body; and
an upper loop cooperatively formed by each leg curving toward each other above the top portion.

10. The pipeline system of claim 9, wherein the pipeline exhibits a diameter of 16 inches or less.

11. The pipeline system of claim 9, wherein the nonmetallic material is selected from the group consisting of a plastic, a thermoplastic material, a thermoset material, a composite material, an elastomer, graphene, concrete, and any combination thereof.

12. The pipeline system of claim 9, wherein each anchor extends from an upper surface of the top portion such that a gap is defined between the nonmetallic support rod and an underside of the upper loop.

13. The pipeline system of claim 9, wherein the one or more anchors comprise first and second anchors separated from each other such that a space is defined therebetween, and wherein a magnitude of the space is sized to receive a pipeline supported on the nonmetallic support rod.

14. A portable pipe support, comprising:
a body providing opposing bottom and top portions;
a nonmetallic support rod arranged within a recess defined in the top portion such that a portion of the nonmetallic rod protrudes above an upper surface of the top portion;
a first anchor spaced from a second anchor along a longitudinal axis of the nonmetallic support rod, the first and second anchors each being embedded within the body at the top portion, and each anchor including:
opposing first and second legs extending substantially parallel to each other and straddling the nonmetallic support rod such that the first and second legs are disposed on opposing sides of the longitudinal axis;
a foot extending laterally from an end of each leg and embedded within the body; and
an upper loop cooperatively formed by each leg curving toward each other above the top portion.

15. The portable pipe support of claim 14, wherein the nonmetallic support rod exhibits a length such that opposing distal ends of the nonmetallic support rod extend past lateral extents of the top portion.

16. The portable pipe support of claim 14, wherein the nonmetallic support rod is immovably secured within the recess.

17. The portable pipe support of claim 14, wherein the nonmetallic support rod is freely received within the recess and able to move within the recess.

18. The portable pipe support of claim 14, wherein each anchor extends from an upper surface of the top portion such that a gap is defined between the nonmetallic support rod and an underside of the upper loop.

* * * * *